United States Patent
Narayanasamy et al.

(10) Patent No.: US 12,238,369 B2
(45) Date of Patent: Feb. 25, 2025

(54) SYSTEM AND METHOD FOR HIGH RESOLUTION, HIGH FRAME RATE VIDEO CAPTURE USING A USB PORT

(71) Applicant: Cypress Semiconductor Corporation, San Jose, AZ (US)

(72) Inventors: Rajagopal Narayanasamy, Bangalore (IN); Sanat Kumar Mishra, Bangalore (IN); Ashwin Nair, Ernakulam (IN); Harsh Gandhi, Nadiad (IN)

(73) Assignee: Cypress Semiconductor Corporation, San Jose, CA (US)

( * ) Notice: Subject to any disclaimer, the term of this patent is extended or adjusted under 35 U.S.C. 154(b) by 61 days.

(21) Appl. No.: 17/957,351

(22) Filed: Sep. 30, 2022

(65) Prior Publication Data

US 2024/0114200 A1 Apr. 4, 2024

(51) Int. Cl.
*H04N 21/44* (2011.01)
*G09G 5/00* (2006.01)
*H04N 7/01* (2006.01)

(52) U.S. Cl.
CPC ............. *H04N 21/44* (2013.01); *G09G 5/006* (2013.01); *H04N 7/012* (2013.01); *G09G 2370/12* (2013.01)

(58) Field of Classification Search
CPC ........ H04N 21/44; H04N 7/012; G09G 5/006; G09G 2370/12
USPC ................................................... 375/240.25
See application file for complete search history.

(56) References Cited

U.S. PATENT DOCUMENTS

| | | | | |
|---|---|---|---|---|
| 7,616,207 B1* | 11/2009 | Diard | .................... | G06T 15/005 |
| | | | | 345/506 |
| 2013/0038769 A1* | 2/2013 | Xiaoping | ................ | G03B 17/56 |
| | | | | 348/E5.022 |
| 2013/0076903 A1* | 3/2013 | Quinn | .................... | H04N 5/772 |
| | | | | 348/148 |
| 2017/0187955 A1* | 6/2017 | Fink | ....................... | H04N 23/45 |
| 2017/0212724 A1* | 7/2017 | Howard | .................. | G06F 5/065 |
| 2020/0236317 A1* | 7/2020 | Kim | ........................ | H04N 25/57 |
| 2021/0037234 A1* | 2/2021 | Wu | ....................... | G06F 13/4282 |
| 2021/0166611 A1* | 6/2021 | Duan | ....................... | G09G 5/006 |

(Continued)

OTHER PUBLICATIONS

H.265 4K Video Encoder IP Core, System-On-Chip Technologies, 2023, https://www.soctechnologies.com/ip-cores/ip-core-h265-4k-encoder.

(Continued)

*Primary Examiner* — Matthew David Kim (57) ABSTRACT

A system and method are provided for capturing a high resolution, high frame rate video using a Universal Serial Bus (USB) port. Generally, the method involves transmitting a High-Definition Multimedia Interface (HDMI) video including a number of video frames from a HDMI-source. Receiving the HDMI video and buffering and splitting each one of the video frames into a plurality of split video frames. Each of the split video frames is converted into a number of USB data packets. USB data packets from each of the split video frames are then interleaved to form a stream of USB data packets. The stream of USB data packets is coupled to a host system, which executes a program to stitch the USB data packets back together to reassemble each of the video frames, and order the video frames to restore or recreate the HDMI video.

20 Claims, 4 Drawing Sheets

(56) References Cited

U.S. PATENT DOCUMENTS

| | | | |
|---|---|---|---|
| 2022/0244794 A1* | 8/2022 | Kaplanis | G06F 13/4282 |
| 2022/0269336 A1* | 8/2022 | Lafontaine | G06T 13/40 |
| 2023/0099405 A1* | 3/2023 | Otsuka | G06F 3/013 |
| | | | 382/232 |
| 2023/0343444 A1* | 10/2023 | Kernick | A47F 7/02 |

OTHER PUBLICATIONS 1.264 4K Video Encoder IP Core, System-On-Chip Technologies, 2023, https://www.soctechnologies.com/ip-cores/ip-core-h264-4k-encoder.

\* cited by examiner

SYSTEM AND METHOD FOR HIGH RESOLUTION, HIGH FRAME RATE VIDEO CAPTURE USING A USB PORT

TECHNICAL FIELD

This disclosure relates generally to video capture, and more particularly to systems and methods for high resolution, high frame rate video capture through or using a USB port.

BACKGROUND

High-Definition Multimedia Interface (HDMI) is a proprietary interface and protocol which can be used for transmitting uncompressed video and audio data from an HDMI-source, such as an HDMI compatible video camera, video player, game console or streaming device, to a notebook or personal computer (PC).

It is frequently desirable to connect an HDMI-source to a device that lacks an HDMI input, for example to view, record or edit video from a video camera or other HDMI-source. This is difficult because while many if not most PCs have an HDMI output port, few include an HDMI input port. However, nearly all notebook computers and PCs support a Universal Serial Bus (USB) interface standard and include one or more USB ports. Thus, previous solutions for transferring video from an HDMI-source to PC have relied on a video encoder coupled between the HDMI-source and PC using, for example, H.264 and H.265 encoding schemes to compress the incoming HDMI video and transfer the video to the PC through a USB port.

Disadvantages of this solution include the need for a very powerful and very expensive high-end Video encoders, currently costing four hundred dollars or more, made using Application Specific Integrated Circuit (ASIC) to perform the compression, the need for an external power supply adaptor to power the video encoder, and more fundamentally lower image quality in the transferred video due to losses realized in compression or the video. This is especially problematic with the latest generation of HDMI sources, such as high end video cameras, which can record video at resolutions of greater than 4K pixels and at frame rates in excess of 60 frames-per-second (fps). In contrast, USB standards are typically designed to transfer compressed data between a host computer and a peripheral device as 'packets,' each packet containing only a small number of bytes of data.

Accordingly there is a need for systems and methods for high resolution, high frame rate video capture or transfer from an HDMI-source to a host system through or using a USB port. It is further desirable that system and method not include a high-cost video encoder with a separate, external power supply, or require compression and decompression of the video data.

SUMMARY

A system and method are provided for capturing a high resolution, high frame rate video using a Universal Serial Bus (USB) port. Generally, the method includes transmitting from a video source a video including a number of video frames using an uncompressed video protocol, receiving the video in a video receiver, and buffering and splitting each of the video frames into a plurality split video frames. Each of the split video frames are converted into a number of data packets, interleaved with the data packets from each of the other split video frames to form a stream of data packets, which is then transmitted to a host system, such as a personal computer or other electronic data processing system. A program in the host system is executed to stitch the data packets together to reassemble and sequentially order each of the number video frames to capture the video. In one embodiment, the video source is a High-Definition Multimedia Interface (HDMI) video source, and the video is a HDMI video transmitted in high definition (HD video) with a resolution of at least 921600 pixels (i.e. 1280×720=921600 pixels) or above and more preferably 8 megapixels (4K× 2K), and at a frame rate of at least sixty (60) frames per second (fps). The number of data packets can include Universal Serial Bus (USB) data packets generated using a USB 3.2 Gen 2 standard or later, and are transmitted to the host system using a USB port.

The video capture system generally includes a video source operable to transmit a video including a number of video frames; a video capture or encoder circuit to receive the video, split each of the video frames into a plurality video frames, and convert the split video frame received into a stream of USB data packets; and host system coupled to thereto through a USB port and operable to receive the stream of USB data packets and execute a program stored in the host system to reassemble and order each of the number video frames to capture the video. In one embodiment, the video capture circuit includes a video splitting and frame buffering (VSFB) circuit operable to sequentially store each of the video frames in a number of frame buffers, and to split each of the video frames vertically or horizontally into the plurality split video frames; a plurality USB controllers coupled to the VFSB circuit, and operable to simultaneously receive a separate one of the split video frames and convert the split video frame received into USB data packets; and a USB hub coupled to each of the USB controllers, and operable to interleave the number of USB data packets from each of the plurality USB controllers to form the stream of USB data packets.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A system and methods are provided for capturing an uncompressed high resolution, high frame rate video using a packet switched protocol and data port. The system and methods of the present disclosure are particularly useful for capturing video from a High-Definition Multimedia Interface (HDMI) video source transmitted in high definition (HD video) with a resolution of at least 921600 pixels (i.e. 1280×720=921600 pixels) or above and more preferably 8 megapixels (4K×2K), and at a frame rate of at least sixty (60) frames per second (fps). The number of data packets can include Universal Serial Bus (USB) data packets generated using a USB 3.2 Gen 2 standard or later, and can be transmitted to the host system using a USB port, such as a USB type C (USB-C) port.

Briefly, the method involves receiving a video including a number of video frames from a video source, buffering each of the video frames and vertically or horizontally splitting each frame into multiple split video frames. In some embodiments, the split video frames are substantially equal sized. Each of the split video frames are then converted into a number of USB data packets, and the USB data packets from each of the split video frames are then interleaved to form a stream of USB data packets. The stream of USB data packets are coupled or transmitted to a host system, which executes a program or application to stitch the USB data packets to reassemble each of the video frames, and ordering the video frames to restore or recreate the video.

By vertically splitting it is meant that a rectangular video frame of x by y pixels is split into n split video frames of x/n by y, where x is a number of pixels in a horizontal direction and y is a number of pixels in a vertical direction. For example, for a high resolution HDMI video having video frames of 3840 by 2160 pixels can be vertically split into three (n=3) split video frames, each of 1280 by 2160 pixels.

By horizontally splitting it is meant that a rectangular video frame of x by y pixels is split into n split video frames of x by y/n, where x is a number of pixels in a horizontal direction and y is a number of pixels in a vertical direction. For example, for a high resolution HDMI video having video frames of 3840 by 2160 pixels can be horizontally split into three (n=3) split video frames, each of 3840 by 720 pixels.

A system for capturing a high-definition video using a packet switched protocol and data port without video compression, will now be described in greater detail with reference to the referenced figures.

Figure 1A:
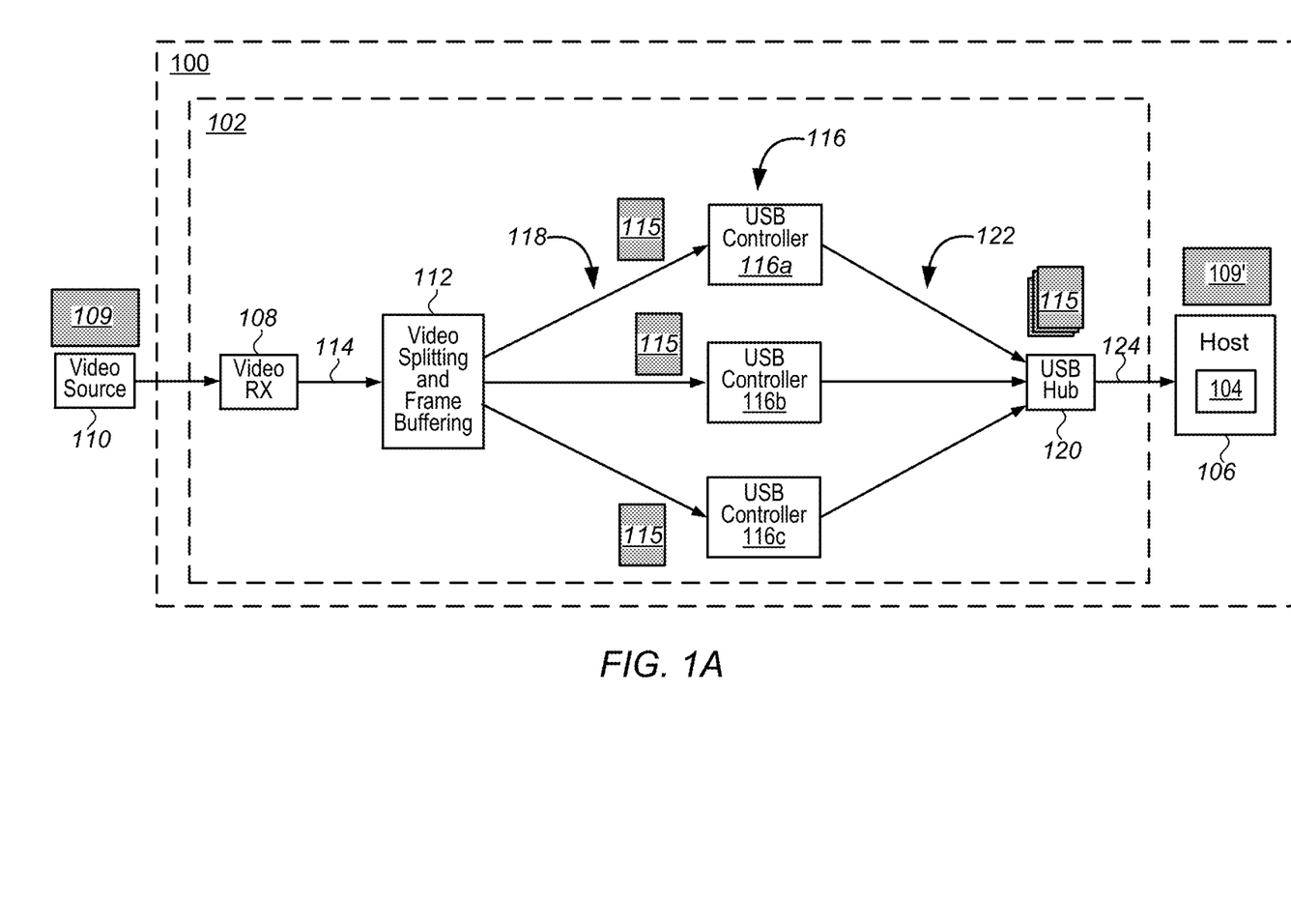
FIG. 1A is a simplified block diagram illustrating an embodiment of a video capture system.

FIG. 1A is a simplified block diagram illustrating an embodiment of a video capture system for accomplishing the video capture outlined above. Referring to FIG. 1A the video capture system 100 generally includes a video capture circuit 102 and an application or program 104 resident in a host system 106 coupled to the video capture circuit through a Universal Serial Bus (USB) port (not shown in this figure).

The host system 106 can include a notebook computer, personal computer (PC), monitor, projector, digital television, video recorder or other electronic data processing system for displaying or playing the captured video, storing or recording the video or for editing the video.

The video capture circuit 102 includes a video receiver 108 configured or operable to receive a video including a number of video frames 109 from a video source 110. The video source 110 can include a video camera, video player, game console or a streaming device capable of transmitting or coupling an uncompressed high resolution, high frame rate video, such as 4K HDMI video at frame rates of up to 60 frames per second (fps) or greater.

The video receiver 108 is further configured or operable to couple the received video to a video splitting and frame buffering (VSFB) circuit 112. The video receiver 108 can be coupled to the VSFB circuit 112 through a number of different interfaces or buses 114 to communicate synchronous video and audio data and to provide control signals to the VSFB circuit 112.

In the embodiment shown, the VSFB circuit 112 is configured or operable to sequentially store each of a number of video frames 109 of a multi-frame video in a frame buffer, and to vertically split each of the video frames vertically into multiple split video frames 115 for transmission to an equal number of USB controllers 116. The VSFB circuit 112 is further operable to add a frame identifier (ID) to each split video frame 115 that is used by the program 104 executed in the host system 106 to reassemble and order each of the number of video frames to capture the video. Generally, data representing each of the split video frames 115 is coupled to one of the USB controllers 116 over separate interfaces and buses 118.

Each USB controller 116 is configured or operable to simultaneously receive a separate one of the split video frames 115 and convert the split video frame received into USB data packets, which are then transmitted or coupled to a USB hub 120 coupled to each of the plurality USB controllers through individual first USB buses 122.

The USB hub 120 is operable to interleave the USB data packets from each of the USB controllers 116 to form a stream of USB data packets that is coupled to the host system 106 over a second USB bus 124. As noted previously, the host system 106 is operable to execute the program 104 stored therein to reassemble the split video frames 115 back into the video frame 109', and order the video frames to capture the video.

Where, as is generally the case, the video includes audio data communicated to the VSFB circuit 112 is further operable to communicate the audio data to at least one of the USB controllers 116 along with data for one of the split video frames 115, and the USB controller is operable to convert the audio data into a second number of USB data packets that the USB hub 120 interleaves with the first, USB data packets from each of the USB controllers including video data related to a video portion of the video. The program 104 executed in the host system 106 is further operable to reconvert the second number of USB data packets into audio data and synchronize the audio data with the video. In this manner, the system 100 is capable of capturing high-definition video and audio and transferring it to a host system without using video compression.

Figure 1B:
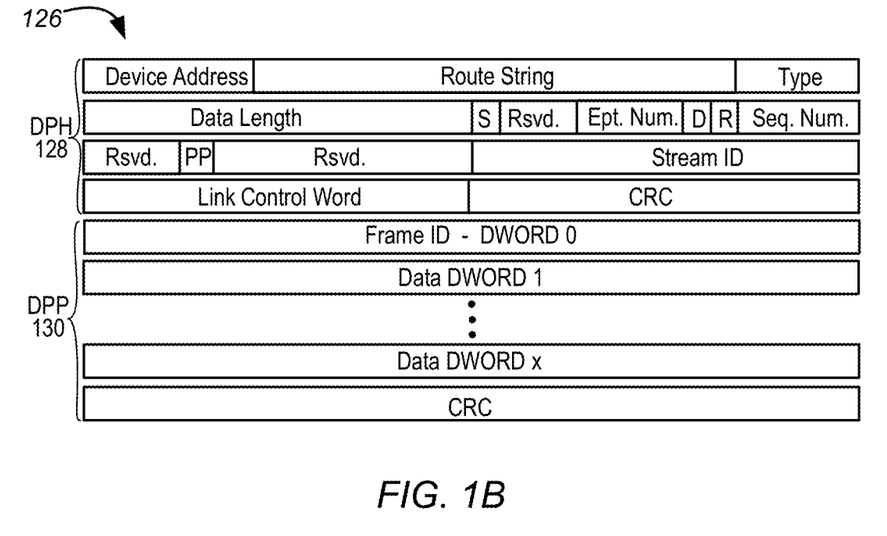
FIG. 1B depicts a Universal Serial Bus (USB) data packet for transmission of split video frame and/or audio data from USB controllers to a USB hub, and from a video capture circuit shown in the video capture system of FIG. 1A to a host system.

FIG. 1B depicts a simplified USB version 3.2× data packet 126 for transmission of split video frame and/or audio data from USB controllers 116 to a USB hub 120, and from the USB hub shown in the video capture circuit 102 of FIG. 1A to the host system. It will be understood that while only a USB data packet is shown and described for purposes of illustrating the operation of the system and method of the present disclosure, USB communication between the USB hub 120 and host system 106 is can and generally does include other types of packets, such as Link Management Packets (LMP), Transaction Packets (TP), and Isochronous Timestamp packets (ITS), provided in the USB3.2 Standard.

Referring to FIG. 1B the USB data packet 126 includes a data packet header (DPH 128) and a data packet payload (DPP 130). The DPH 128 includes a number of data-words or fields including a Device Address field to identify the source of data packet 126 (the USB controller 116a-c or the USB hub 120), a Type field to identify the type of packet (data packet), a Data Length field to indicate a size or length of the packet in bytes, and a cyclical redundancy checks (CRC) field for error checking. As shown in FIG. 1B, the DPH 128 can and generally does include a number of other known fields used for other purposes relating to USB data communication that are not directly relevant to the invention of the present disclosure, and are omitted to avoid unnecessary detail.

The DPP 130 of the USB data packet 126 likewise includes multiple data-words or fields as defined by the USB standard, each comprising from 8 to 64 bytes, and generally ending with a CRC data word (DWORD). In accordance with the system and method of the present disclosure, one field or DWORD conveys the Frame ID added by the VSFB circuit 112 as described above, and used by the program 104 executed in the host system 106 to reassemble and order each of the number of video frames 109'. Additionally, the DPP 130 can further include a separate DWORD to which split video frame 115 the data in the USB data packet 126 applies. For example, where the video frame 109 is split vertically into three (3) split video frames 115, as shown in FIG. 1A, this separate DWORD can identify whether the data in the USB data packet 126 is for a left hand side of the video frame, a right hand side or a middle portion in between.

Alternatively, where the VSFB circuit 112 is configured to send, for example, a left hand split video frame 115 of all video frame 109 to a first USB controller 116a, a middle portion of the split video frame to a second USB controller 116b, and a right hand split video frame to a third USB controller 116c, and where the device address field is used to identify the particular USB controller that is the originating source of the USB data packet 126 (rather than the USB hub 120) the device address field can be used by the program 104 executed in the host system 106 to reassemble the split video frames 115 in the proper order for each video frame 109'.

Figure 2:
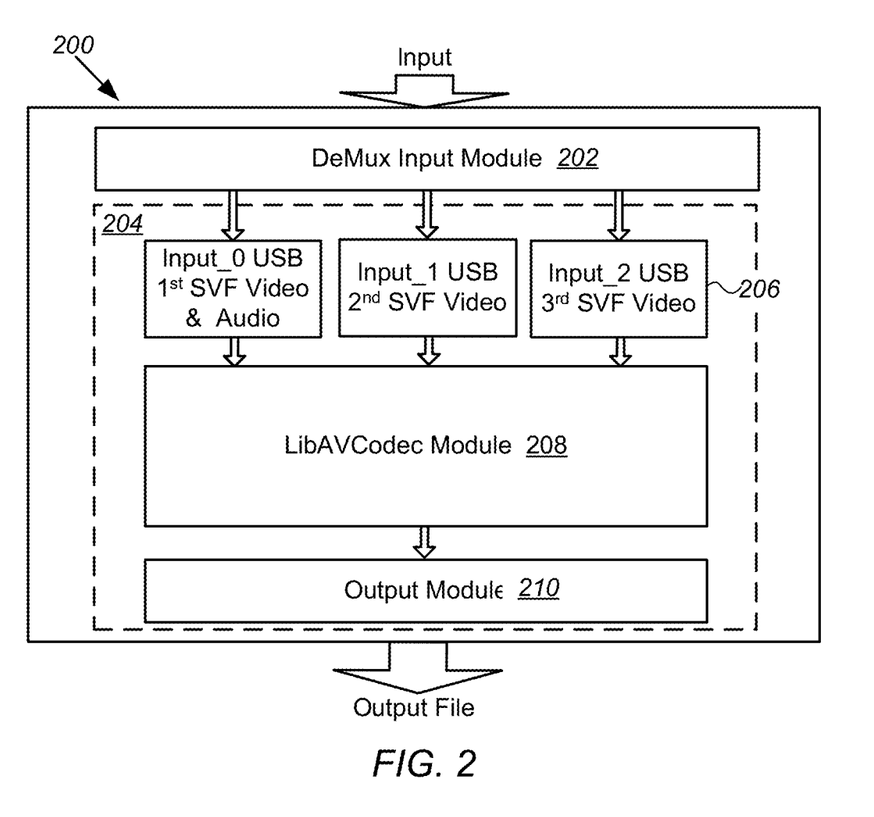
FIG. 2 is a simplified schematic block diagram illustrating a computer program residing in a memory in the host system to stitch split video frames encompassed by USB data packets together to reform a number of video frames, and to reassemble and arrange the order of each video frame to capture the video in the host system.

FIG. 2 is a simplified schematic block diagram illustrating a computer program 200 residing in a memory in the host system, and operable when executed to stitch split video frames encompassed by USB data packets together to reform a number of video frames, and to reassemble and arrange the order of each video frame to capture the video in the host system. Referring to FIG. 2, the computer program 200 includes a de-multiplexing interface or input module (DeMux Input Module 202), and a command-line module 204.

The DeMux Input Module 202 includes program code operable to receive and de-multiplex the stream of USB data packets (Input) from a USB hub of a video capture system, such as described above with reference to FIG. 1A, and to distribute or couple each split video frame of a video frame to a separate input module 206 in the command-line module 204.

The command-line module 204 is a software program for converting audio and video data between different formats or containers for converting audio and video data between different formats or containers. In one embodiment, the command-line module 204 is a Fast Forward Moving Picture Experts Group (ffmpeg) tool. An ffmpeg tool is a freely available, open source tool consisting of a suite of libraries and programs for receiving video and audio files or streams from multiple inputs, and capable of transcoding, editing and outputting a video file or stream in a number of different formats or containers for playing or recording. Thus, a command-line module 204 including an ffmpeg tool is particularly suitable for receiving a stream of USB data packets encompassing data from multiple split video frames; stitching the split video frames together to reassemble a video frames, and ordering the video frame and subsequent video frames to capture a high resolution, high frame rate video input to the host system without using video compression.

Referring again to FIG. 2 the command-line module 204 including an ffmpeg tool generally includes a number of input modules 206, each configured or operable for receiving a split video frame of a video frame as USB data from the DeMux Input Module 202, and coupling the split video frames core or module (LibAVCodec 208), and an output module 210. The LibAVCodec 208 generally includes a number of audio-video libraries and encoding and decoding (Codec) program to translate the USB data into a format and in a container compatible with a player, recording or editing program in the host system. For example, the LibAVCodec 208 can be configured or operable to receive multiple USB data inputs from the input modules 206, translate the data to a Moving Picture Experts Group (MPEG) video file, and arrange the order of the separate input split video frames to reassemble the video frame.

Figure 3:
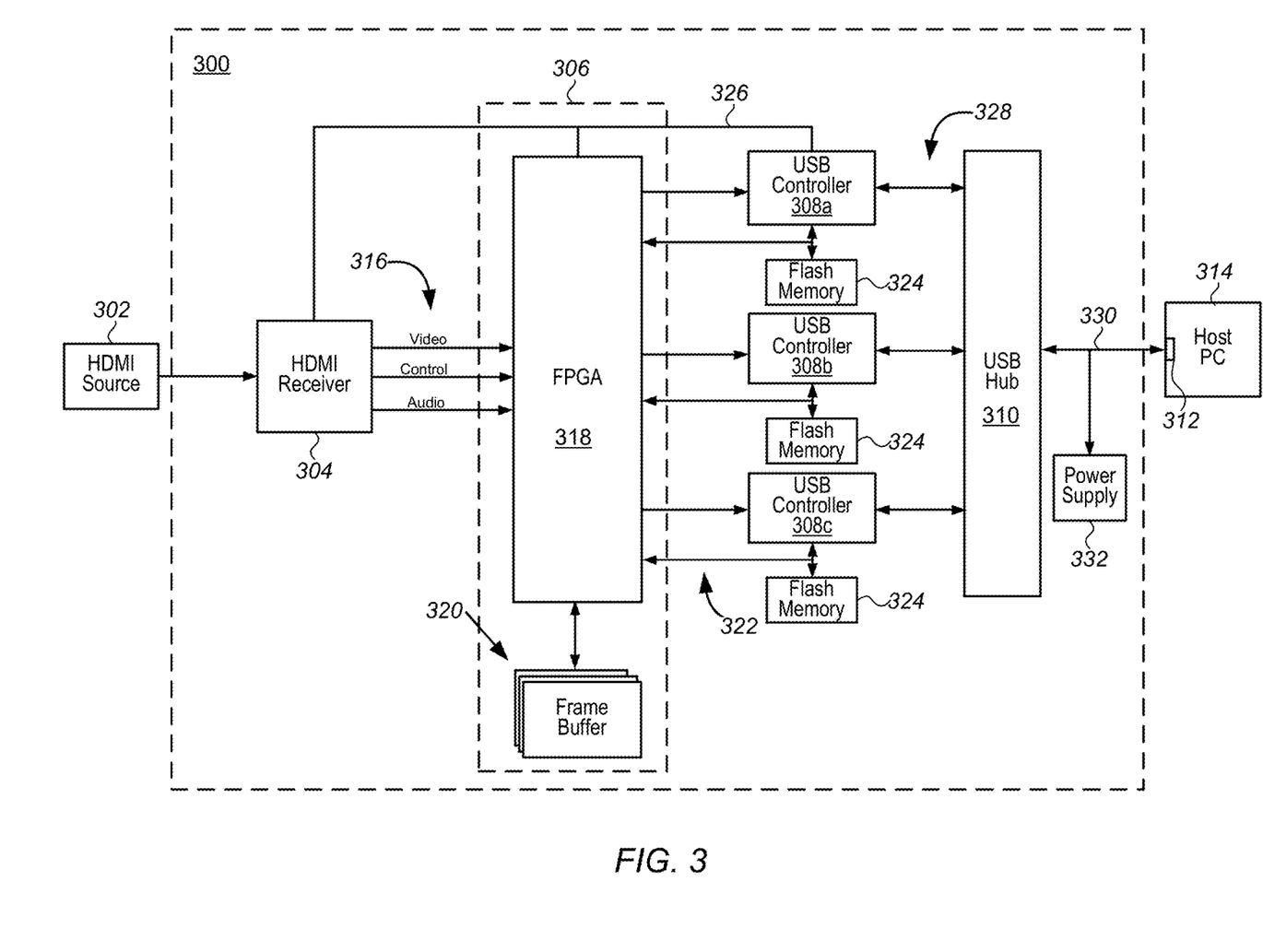
FIG. 3 is a schematic block diagram of an embodiment of a video capture circuit.

FIG. 3 is a schematic block diagram of an embodiment of a video capture circuit 300 suitable for use in capturing a HDMI video transmitted from an HDMI source 302, such as a video camera, in high definition (HD video) with a resolution of at least 921600 pixels (i.e. 1280×720=921600 pixels) or above and more preferably 8 megapixels (4K× 2K), and at a frame rate of at least sixty (60) frames per second (fps). The video capture circuit 300 can be implemented as a number of discrete integrated circuits (ICs) and components in a multi-chip module or mounted to one or more circuit boards (PCBs), and enclosed in a common housing. In one embodiment, the video capture circuit 300 is implemented as a dongle powered through a USB port in the host system and having at least one HDMI input, and a USB 3.2 output.

Referring FIG. 3 the video capture circuit 300 generally includes a video receiver 304, a video splitting and frame buffering (VSFB) circuit 306, multiple USB controllers 308a-c coupled to the VFSB circuit, and a USB hub 310 coupled to each of the USB controllers, and through a USB port 312 to a host system 314.

The video receiver 304 is an HDMI video receiver can include, for example, a HDMI version 2.0 or later receiver and can be coupled to the VSFB circuit 306 through a number of different interfaces or buses 316, including a video interface and bus for transferring video data using a 2×30 bit red, green, blue (RGB) or a YUV color model, a control bus, and an audio bus, such as an inter-integrated circuit sound ($I^2S$) serial bus, to communicate audio data signals associated with the video.

The VSFB circuit 306 can include or be implemented using commercially available components including a field programmable gate array (FPGA 318), and a number of Synchronous Dynamic Random-Access Memory (SDRAM) integrated circuits coupled to the FPGA to function as frame buffers 320 operable to store the number of video frames. The VSFB circuit 306 is configured or operable to sequentially store each of a number of video frames of a multi-frame video in a frame buffer, and to split each of the video frames vertically or horizontally into multiple split video frames before transmission to the USB controllers 308*a-c*. The VSFB circuit 306 is further operable to add a frame identifier (ID) to each split video frame that is used by an application or program executed in the host system 314 to reassemble and order each of the number of video frames to capture the video. Where, as is generally the case, the video includes audio data communicated to the VSFB circuit 306 through the audio bus, the VSFB circuit is further operable to communicate the audio data to at least one of the USB controllers 308*a-c* along with data for one of the split video frames, and the USB controller is operable to convert the audio data into a second number of USB data packets. The USB hub 310 interleaves the second number of USB data packets with first, USB data packets including data related to a video portion of the video from the USB controllers, transmits or streams the USB data packets to the host system 314. An application or program executed in the host system 314 reconverts the second number of USB data packets into audio data, and synchronize the audio with the video.

The USB controllers 308*a-c* receive and convert the split video frames into USB data packets, which are then transmitted or coupled to a USB hub 310. The USB controllers 308*a-c* can include FX3 USB 3.2 Gen 1 Device Controllers, commercially available from Infineon Technologies of San Jose, California, and can be coupled to the VSFB circuit 306 over separate, individual interfaces and synchronous buses 322 using a multibit first-in, first-out (FIFO) mode compatible with a particular model of USB controller used. For example, where the USB controllers 308*a-c* include FX3 USB 3.2 Gen 1 (e.g., having a 5 Gbps throughput) Device Controllers, data representing each of the split video frames is coupled to the USB controllers using a 32 bit slave FIFO mode. The video capture circuit 300 further includes a number of flash memories 324, each coupled to one of the multiple USB controllers 308*a-c*, and each of the USB controllers are operable to boot from the flash memory coupled thereto. Additionally, as in the embodiment shown, the USB controllers 308*a-c* can include a master USB controller 308*a* coupled to the VSFB circuit 306 and to the video receiver 304 through an Inter-Integrated Circuit bus (I²C bus 326) to configure the VSFB circuit and the video receiver via the I²C bus after booting.

The USB hub 310 is coupled to each of the multiple USB controllers 308*a-c* through first USB buses 328 (up to 5 Gbps) and to the host system 314 through a single, second USB bus 330 (10 Gbps), both of which are compatible with a USB 3.2 standard. The USB hub 310 is operable to interleave the USB data packets from each of the USB controllers 308*a-c* to form a stream of USB data packets that is then coupled to the host system 314 over a second USB bus 330. The USB hub 310 can include, for example a HX3PD that is a USB 3.2 Gen 2 hub, commercially available from Infineon Technologies of San Jose, California, capable of supporting an upstream bandwidth of 10 Gigabits per second (Gbps) or more. The USB hub 310 is operable to interleave the USB data packets from each of the USB controllers 308*a-c* to form a stream of USB data packets that is then coupled to the host system 314 over the second USB bus 330.

In some embodiments, such as that shown, the video capture circuit 300 further includes a power supply 332 coupled to the second USB bus 330, the power supply configured or operable to receive power from the host system 314 through the USB port 312, and to provide power at one or more different voltage levels to all of the video capture circuit, and to completely power the video receiver 304, VSFB circuit 306, USB controllers 308*a-c* and the USB hub 310, without the need for a separate power supply or external power source to the video capture circuit and host system.

The USB port 312 can include any compatible type of USB port, such as USB-A or USB-C. In one embodiment, for example, USB port 312 includes a USB version 3.2 Gen 2 type C port, or USB-C port.

In operation, when the USB controllers 308*a-c* include FX3 USB 3.2 Gen 1 Device Controllers, one USB controller 308*a* acts as the master, and the remaining USB controllers 308*b*, 308*c* act as slaves. Initial programming of the USB controllers 308*a-c* is performed in USB mode. After programming is complete, the boot mode for the USB controllers 308*a-c* is set to serial peripheral interface (SPI) and the video capture circuit 300 is rebooted. Upon rebooting, the USB controllers 308*a-c* boot from their respective flash memories 324 and master USB controller 308*a* is operable to configure the FPGA 318 and video receiver 304 via the I²C bus 326. After this, all the USB controllers 308*a-c* configure their General Programmable Interface (GPIF) to the FPGA 318 as 32-bit 100 MHz slave FIFO interface, enumerate each USB controller as USB Video Class (UVC) and USB Audio Class (UAC) devices to the host system 314, and wait for an HDMI event to occur. A HDMI event occurs when a HDMI source 302 is connected to the video capture circuit 300 after which the video capture circuit splits the video and sends it to the host system 314. As discussed above, video capture circuit 300 operates to receive, process, and transmit high-definition video without using video compression.

Figure 4:
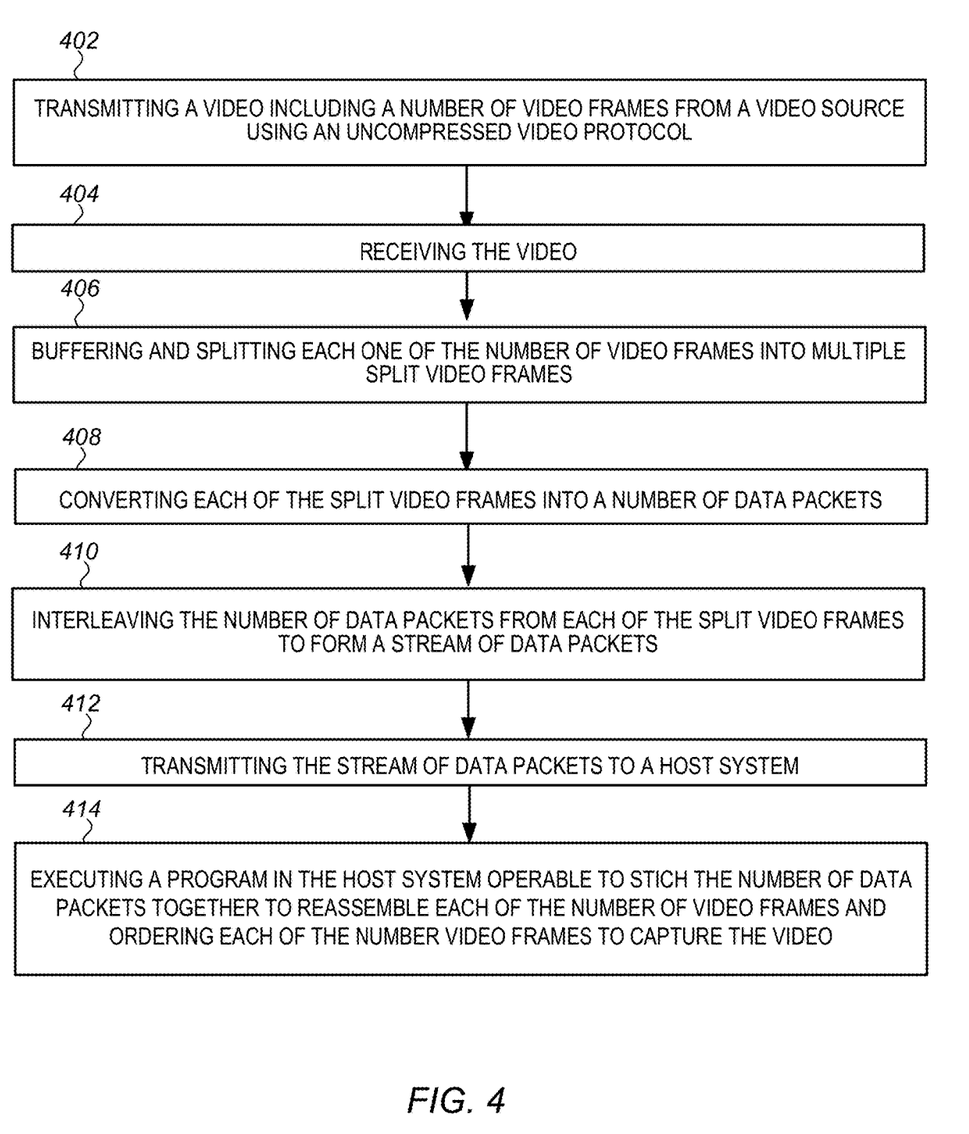
FIG. 4 a flowchart illustrating a method for capturing a high resolution, high frame rate video using a Universal Serial Bus (USB) Port.

A method for capturing a high resolution, high frame rate video using or through a USB port will now be described with reference to the flowchart of FIG. 4. Referring to FIG. 4 the method begins with transmitting or coupling a video including a number of video frames from a video source using an uncompressed video protocol (step 402). Next, the video is received (step 404), and each of the number of video frames is sequentially buffered as received and vertically split into multiple split video frames (step 406). Each of the split video frames are then converted into a number of USB data packets (step 408), and the number of data packets from each of the split video frames interleaved to form a stream of data packets (step 410). The stream of data packets is then transmitted to a host system (step 412), where an application or program is executed in the host system to stitch the split video frames encompassed by the number of data packets back together to reassemble each of the number of video frames and ordering each of the number video frames to capture the video (step 414). The host system can then play or record the captured the video for later playing or editing.

Where the video includes audio data the method further includes converting the audio data into a number of second USB data packets, transmitting the second USB data packets to the host system, and wherein executing the program in the host system further includes reconverting the second number of USB data packets into audio data and synchronizing the audio data with the video.

Thus, systems and methods for capturing or transferring high resolution, high frame rate video from video-source to a host system without the need for a high-cost video encoder, a separate, external power supply, or compression and decompression of the video data have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It will be understood that the technique of splitting large, uncompressed data into multiple portions or segments for conversion by multiple USB controllers and subsequent communication to a PC or other electronic data processing system through a USB port can be applied to other applications. For example, the system and method described above can be used for coupling various measurement channels of an oscilloscope or other high-resolution test equipment to a PC with adaption of the input port to the system.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method comprising:
   transmitting a video including a number of video frames from a video source using an uncompressed video protocol;
   receiving the video;
   buffering and splitting each one of the number of video frames into a plurality of split video frames, each of the split video frames in the uncompressed video protocol;
   simultaneously receiving and converting each of the split video frames in one of a plurality Universal Serial Bus (USB) controllers into a first number of USB data packets;
   coupling the first number of USB data packets from the plurality of USB controllers to a USB hub and interleaving the first number of USB data packets in the USB hub to form a stream of USB data packets;
   transmitting the stream of USB data packets to a host system; and
   executing a program in the host system to stitch the split video frames encompassed by the number of data packets together to reassemble each of the number of video frames and ordering each of the number video frames to capture the video.

2. The method of claim 1 wherein the video is High-Definition Multimedia Interface (HDMI) video.

3. The method of claim 2 wherein the HDMI video is transmitted with a resolution of at least eight (8) megapixels and at a frame rate of at least sixty (60) frames per second (fps).

4. The method of claim 2 wherein the HDMI video includes audio data, and the method further comprises converting the audio data into a second number of USB data packets, transmitting the second number of USB data packets to the host system, and wherein executing the program in the host system comprises reconverting the second number of USB data packets into audio data and synchronizing the audio data with the video.

5. The method of claim 2 wherein transmitting the stream of USB data packets to the host system comprises transmitting the stream of USB data packets to the host system using a USB port.

6. The method of claim 1 wherein splitting each one of the number of video frames into the plurality split video frames comprises adding a frame identifier (ID) to each split video frame wherein the program executed in the host system uses the frame identifier to reassemble each of the number of video frames and order each of the number video frames to capture the video.

7. The method of claim 1 wherein splitting each one of the number of video frames into the plurality split video frames comprises vertically splitting each one of the number of video frames.

8. The method of claim 1 wherein splitting each one of the number of video frames into the plurality split video frames comprises horizontally splitting each one of the number of video frames.

9. The method of claim 1 further comprising playing the captured video on a display in or coupled to the host system, or recording the captured video for later playing or editing using the host system.

10. A video capture system comprising:
    a video source operable to transmit a video including a number of video frames;
    a video receiver operable to receive the video, and couple the video to a video splitting and frame buffering (VSFB) circuit, the VSFB circuit operable to sequentially store each of the number of video frames in a frame buffer and split each of the number of video frames into a plurality split video frames;
    a plurality Universal Serial Bus (USB) controllers coupled to the VFSB circuit, each controller operable to simultaneously receive a separate one of the split video frames and convert the split video frame received into a first number of USB data packets;
    a USB hub coupled to each of the plurality USB controllers, and operable to interleave the first number of USB data packets from each of the plurality USB controllers to form a stream of USB data packets; and
    a host system including a USB port operable to receive the stream of USB data packets,
    wherein the host system is operable to execute a program stored therein to reassemble and order each of the number video frames to capture the video.

11. The system of claim 10 wherein the video source is a High-Definition Multimedia Interface (HDMI) video source, and wherein the video is transmitted at a resolution of at least eight (8) megapixels and at a frame rate of at least sixty (60) frames per second (fps).

12. The system of claim 10 wherein the video includes audio data, and wherein:
the video receiver is operable to serially communicate the audio data to the VSFB circuit using an I²C interface standard;
the VSFB circuit is operable to communicate the audio data to at least one of the plurality USB controllers with one of the split video frames;
the at least one of the plurality USB controllers receiving the audio data is operable to convert the audio data into a second number of USB data packets;
the USB hub is operable to interleave the second number of USB data packets with the first number of USB data packets in the stream of USB data packets; and
the program executed in the host system is further operable to reconvert the second number of USB data packets into audio data and synchronize the audio data with the video.

13. The system of claim 10 wherein the VSFB circuit is operable to add a frame identifier (ID) to each split video frame, and wherein the program executed in the host system uses the frame ID to reassemble and order each of the number of video frames to capture the video.

14. The system of claim 10 further comprising a power supply operable to receive power from the host system through the USB port, and to provide power at a number of voltage levels to completely power the video receiver, VSFB circuit, the plurality USB controllers and the USB hub.

15. The system of claim 10 further comprising a number of flash memories, each coupled to one of the plurality USB controllers, and wherein the plurality USB controllers are operable to boot from flash memories coupled thereto.

16. The system of claim 10 wherein the plurality USB controllers include a master USB controller coupled to the VSFB circuit and to the video receiver through an Inter-Integrated Circuit (I²C) bus, and wherein after booting the master USB controller is operable to configure the VSFB circuit and the video receiver via the I²C bus.

17. The system of claim 10 wherein the VSFB circuit includes a field programmable gate array (FPGA).

18. The system of claim 17 wherein the VSFB circuit further includes a number of Synchronous Dynamic Random-Access Memory (SDRAM) integrated circuits coupled to the FPGA as frame buffers operable to store the number of video frames.

19. The system of claim 10 wherein the VSFB circuit is operable to split each of the number of video frames vertically or horizontally into the plurality split video frames.

20. The system of claim 10 wherein the video source comprises a video camera and wherein the host system is coupled to a display to play the captured video, and a memory to record the captured the video for later playing or editing using the host system.

* * * * *